(12) United States Patent
Park (10) Patent No.: US 11,195,197 B2
(45) Date of Patent: Dec. 7, 2021

(54) ONLINE AND OFFLINE MARKETING MANAGEMENT SERVER USING NFC TAG

(71) Applicant: DeDdang Co., Ltd., Gangnam-gu Seoul (KR)

(72) Inventor: Sung Ho Park, Gangnam-gu Seoul (KR)

( * ) Notice: Subject to any disclaimer, the term of this patent is extended or adjusted under 35 U.S.C. 154(b) by 126 days.

(21) Appl. No.: 16/609,451

(22) PCT Filed: Nov. 28, 2018

(86) PCT No.: PCT/KR2018/014775
§ 371 (c)(1),
(2) Date: Oct. 30, 2019

(87) PCT Pub. No.: WO2019/194388
PCT Pub. Date: Oct. 10, 2019

(65) Prior Publication Data
US 2020/0090206 A1    Mar. 19, 2020

(30) Foreign Application Priority Data

Apr. 6, 2018    (KR) .......................... 10-2018-0040414

(51) Int. Cl.
*G06Q 30/02*    (2012.01)
*G05D 1/10*    (2006.01)
(Continued)

(52) U.S. Cl.
CPC ......... *G06Q 30/0224* (2013.01); *G05D 1/101* (2013.01); *G06Q 10/047* (2013.01);
(Continued)

(58) Field of Classification Search
None
See application file for complete search history.

(56) References Cited

U.S. PATENT DOCUMENTS

2012/0271717 A1\* 10/2012 Postrel ............... G06Q 30/0267
705/14.58
2018/0122022 A1\* 5/2018 Kelly ..................... G06Q 50/12

FOREIGN PATENT DOCUMENTS

KR    10-2012-0137622 A    12/2012
KR    10-2015-0068540 A    6/2015
(Continued)

*Primary Examiner* — Kristy A Haupt
(74) *Attorney, Agent, or Firm* — Patshegen IP LLC; Moshe Pinchas (57) ABSTRACT

The present invention relates to an online/offline market management server using a near-field communication (NFC) tag. The online/offline marketing management server using an NFC tag according to an embodiment of the present invention includes a communication unit configured to communicate with a user terminal, an near-field communication tag managing unit configured to manage NFC tag information formed at a business site; a reward means managing unit configured to accumulate a reward means, such as points or a coupon, on an account of the user terminal or manage the reward means to be used when the NFC tag is recognized from the user terminal; and a route guiding unit configured to acquire a user's consumption pattern according to time and region from the user terminal and display at least one activity route on an electronic map to provide a schedule by which reward means of a plurality of business sites can be accumulated or used.

4 Claims, 7 Drawing Sheets

(51) Int. Cl.
 *G06Q 10/04* (2012.01)
 *G06Q 20/32* (2012.01)
 *G10L 25/51* (2013.01)
 *G06K 7/10* (2006.01)

(52) U.S. Cl.
 CPC ..... *G06Q 20/3272* (2013.01); *G06Q 20/3278* (2013.01); *G06Q 30/0238* (2013.01); *G10L 25/51* (2013.01); *G06K 7/10297* (2013.01)

(56) References Cited

FOREIGN PATENT DOCUMENTS

KR 10-2016-0039751 A 4/2016
KR 10-2016-0046513 A 4/2016
KR 10-2017-0080009 A 7/2017

* cited by examiner

ONLINE AND OFFLINE MARKETING MANAGEMENT SERVER USING NFC TAG

TECHNICAL FIELD

The present invention relates to an online/offline marketing management server using a near-field communication (NFC) tag, and more specifically, to a technology for paying a reward means, such as points or a coupon, to a user who actually visits an offline business site by recognizing an NFC tag formed in the business site.

BACKGROUND ART

In general, public relations (PR) refers to all practices to transmit necessary information at a charge or free of charge through media for the purpose of selling products to customers or enhancing the use of services or a company or organization's reputation. PR is a type of persuasive communication activity that promotes sales by simultaneously advertising the presence of products and services to a large number of customers.

Korean Patent Registration No. 10-1302901 (registered on Aug. 27, 2013) which relates to "Advertisement system using points" provides an advertisement system using points which includes a user point calculation module configured to calculate user points for one of an advertisement exposed in an advertisement page and an advertisement selected and viewed by a user terminal, a point accumulation module configured to classify the user points by advertiser and accumulate the user points, and a point processing module configured to apply user points when the user terminal purchases any one of products and services on the advertisement page, wherein when the user terminal is exposed to an advertisement or selects an advertisement on the advertisement page, user points corresponding to the selected or exposed advertisement are allowed to be used in trading an advertisement target product, thereby maximizing an advertisement effect.

However, in the above-described method of accumulating and paying general advertisement points (PR points) and the prior art, accumulation of points according to viewing of an advertisement is performed by a cashier at an affiliated store who proceeds to accumulate and settle the points through a point-of-sale (POS) terminal, so that there is a limitation in that an available range of the use of points is limited.

Technical Problem

To overcome the technical problems, one objective of the present invention is to provide an online/offline marketing management server using a near-field communication (NFC) tag which pays a reward means, such as points or a coupon, to a user who has recognized an NFC tag formed in a business site, and guides the user to a business site where a reward means optimized to a user's consumption pattern.

Also, another objective of the present invention is to provide an online/offline marketing management server using an NFC tag which allows sound wave information or pattern information, together with an NFC tag, to be input, thereby identifying a user who actually visits a business site and paying points.

In addition, another objective of the present invention is to provide an online/offline marketing management server using an NFC tag which uses a drone to provide a user with an action of tagging an NFC tag as a play and guides a route to a business site through the drone.

TECHNICAL SOLUTION

According to one embodiment, an online/offline marketing management server using a near-field communication (NFC) tag includes a communication unit configured to communicate with a user terminal, an NFC tag managing unit configured to manage NFC tag information formed at a business site, a reward means managing unit configured to accumulate a reward means, such as points or a coupon, on an account of the user terminal or manage the reward means to be used when the NFC tag is recognized from the user terminal, and a route guiding unit configured to acquire a user's consumption pattern according to time and region from the user terminal and display at least one activity route on an electronic map to provide a schedule by which reward means of a plurality of business sites can be accumulated or used.

The online/offline marketing management server may further include a payment processing unit configured to process an advanced reservation at the business site on the activity route and allow payment to be made by reflecting the reward means from a predetermined payment means when the NFC tag is recognized from the user terminal.

When the NFC tag is formed in a drone flying in the business site, the NFC tag managing unit may manage a flight path of the drone with a preset schedule and vary an accumulation of the reward means according to a location of the drone.

The reward means managing unit may compare first sound wave information transmitted from the user terminal and second sound wave information transmitted from the business site and pay an additional reward means to the account of the user terminal when the first sound wave information matches the second sound wave information.

The NFC tag managing unit may use the drone to guide a travel route from a location of the user terminal to the business site where the reward means is provided.

Advantageous Effects

Accordingly, it is possible to pay a reward means, such as points or a coupon, to a user who has recognized a near-field communication (NFC) tag formed in a business site and to guide the user to a business site where a reward means optimized to a consumption pattern of the user is provided.

In addition, it is possible to pay points by allowing sound wave information or pattern information, together with an NFC tag, to be input and identifying a user who actually visits the business site.

Also, it is possible to use a drone to provide the user with an action of tagging an NFC tag as a play and to guide a route to the business site through the drone.

MODE FOR INVENTION

Hereinafter, in order to facilitate understanding and reproduce by those skilled in the art, the present invention will be described in detail by explaining exemplary embodiments with reference to the accompanying drawings. Terms described in below are selected by considering functions in the embodiment and meanings may vary depending on, for example, a user or operator's intentions or customs. Therefore, in the following embodiments, when terms are specifically defined, the meanings of terms should be interpreted based on definitions, and otherwise, should be interpreted based on general meanings recognized by those skilled in the art.

Figure 1:
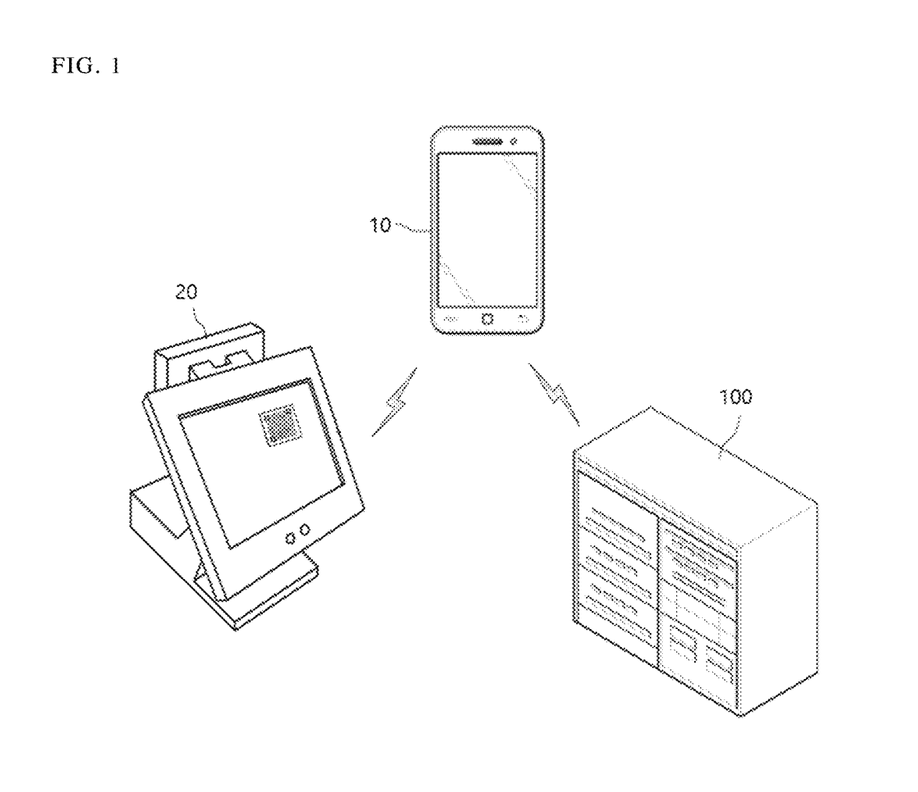
FIG. 1 is a configuration diagram of a point management system using a near-field communication (NFC) tag according to one embodiment of the present invention.

FIG. 1 is a configuration diagram of a point management system using a near-field communication (NFC) tag according to one embodiment of the present invention.

Referring to FIG. 1, the point management system using an NFC tag according to one embodiment of the present invention includes a user terminal 10, a business operator terminal 20, and an online/offline marketing management server 100.

The user terminal 10 refers to a terminal of a user who intends to use a reward means, such as points or coupons, by visiting a business site of an operator. The user terminal 10 is capable of long-range network communication, such as $3^{rd}$ generation (3G), 4G, 5G, WiBro, or the like, as well as a short-range network communication, such as WiFi, ZigBee, NFC, or Bluetooth. The user terminal 10 may recognize an NFC tag formed in the business site to acquire the reward means, such as points or coupons, and use the acquired reward means.

Also, the user terminal 10 may have a camera module mounted therein, photograph an identification code formed in the business site, and transmit an image of the identification code to the online/offline marketing management server 100. In addition, the user terminal 10 may include a function of detecting sound or ultrasonic waves. Moreover, the user terminal 10 may also include a tilt sensor, an acceleration sensor, an illuminance sensor, and the like, as needed.

The business operator terminal 20 is a terminal used in the business site. The business operator terminal 20 is connected to the online/offline marketing management server 100 and manages payment, payment of a reward means, and an NFC tag. In this case, the NFC tag may be formed in the business operator terminal 20 or be formed in the business site. The business operator terminal 20 may update and manage identification information of the NFC tag at a predetermined time interval. The NFC tag includes link information that can be used to earn or use the unique reward means of the business site.

In addition, the business operator terminal 20 may be implemented as a point-of-sale (POS) terminal. The business operator terminal 20 may provide the identification code received from the online/offline marketing management server 100 through a display while changing the identification code at a predetermined time interval. The identification code may be implemented as a barcode, which is one-dimensional code, a quick response (QR) code, which is two-dimensional code, or an augmented reality (AR) code, which is three-dimensional code, but is not limited thereto. The business operator terminal 20 may output a voice or ultrasonic signal output in the business site.

The online/offline marketing management server 100 may communicate with the user terminal 10 and the business operator terminal 20. The online/offline marketing management server 100 may manage the NFC tag formed in the business site or the identification code, and may replace the NFC tag or the identification code periodically. Also, when the online/offline marketing management server 100 acquires the identification code in the business site, the online/offline marketing management server 100 may verify the identification code, and accumulate points on an account of the user terminal 10 or issue a coupon. The online/offline marketing management server 100 may be provided with information of the identified user terminal 10 from the business operator terminal 20. Hereinafter, the online/offline marketing management server 100 will be described in detail with reference to FIG. 2.

Figure 2:
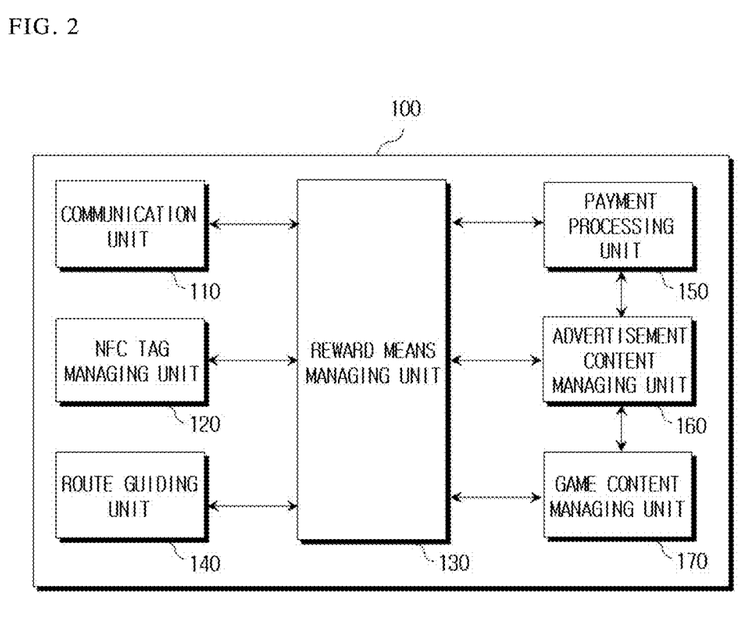
FIG. 2 is a configuration diagram illustrating an online/offline marketing management server using an NFC tag according to one embodiment of the present invention.

FIG. 2 is a configuration diagram illustrating an online/offline marketing management server using an NFC tag according to one embodiment of the present invention.

Referring to FIG. 2, the online/offline marketing management server 100 using an NFC tag according to one embodiment of the present invention includes a communication unit 110, an NFC tag managing unit 120, a reward means managing unit 130, and a route guiding unit 140.

The communication unit 110 is capable of network communication with a user terminal or a business operator terminal. The communication unit 110 receives information of an NFC tag acquired by the user terminal in a business site. For example, when the user terminal acquires the information through the NFC tag of the business site, the communication unit 110 may allow a reward means, such as a point or a coupon of the corresponding business site to be accumulated on an account of the corresponding user terminal or to be used.

Also, the communication unit 110 may receive a barcode, a QR code, an AR code, a voice signal, an ultrasonic signal, a pattern signal, or the like of the business site as identification code. The communication unit 110 periodically changes the identification code using the user terminal provided in the business site and provides the changed identification code. The communication unit 110 is capable of short-range network communication or long-range network communication. In addition, the communication unit 110 is capable of communicating with an external Internet server or financial server.

The NFC tag managing unit 120 manages an NFC tag formed in the business site. At least one NFC tag is installed in the business site. In this case, unique information of the NFC tag may be changed at a predetermined time interval in order to prevent a fraudulent user. The NFC tag managing unit 120 may encrypt the unique number of the business site and output the encrypted number as an identification code in the form of symbols, characters, or the like. In this case, the user terminal may photograph the identification code formed at the business site with a camera, or recognize the NFC tag and transmit the NFC tag to the online/offline marketing management server 100.

Also, the NFC tag managing unit 120 may output predetermined sound wave information using the business operator terminal in the business site. For example, when the business operator terminal outputs an ultrasonic signal, the user terminal recognizes the ultrasonic signal and transmits the ultrasonic signal to the online/offline marketing management server 100. In this case, the user terminal may primarily acquire an NFC tag and acquire secondarily sound wave information, such as an ultrasonic signal. This is to prevent indiscriminate collection and abuse of NFC tags formed in the business site.

The reward means managing unit 130 accumulates predetermined points to the account of the user terminal when the NFC tag is recognized from the user terminal. The reward means managing unit 130 determines whether the NFC tag transmitted from the user terminal matches the NFC tag of the corresponding business site. In this case, the reward means managing unit 130 may determine the authenticity of the NFC tag using location information of the user terminal. For example, points may be set to be paid only when the location information of the user terminal matches location information of the business site on the identification code. Such points may be used as cash by the user in the business site and may be set to be used in any business site managed by the online/offline marketing management server 100.

In addition, when the NFC tag managing unit 120 changes an identification tag of the business site into at least one of symbols, characters, and figures at a predetermined time interval, the reward means managing unit 130 may combine the changed identification tag with an identification tag obtained at a different point in time and provide additional points. For example, when a predetermined event combination is formed by combining a first identification tag obtained from the user terminal in the business site at a first time point and a second identification tag obtained at a second time point, an additional reward means may be paid to the account of the user terminal. When the user stays at the business site for a specific period of time, an additional reward may be given for this activity, or an additional reward may be set to be paid when the user visits the business site to acquire an NFC tag and afterwards acquires an identification tag included a receipt after paying for a product or a service.

Also, the reward means managing unit 130 may compare first sound wave information transmitted from the user terminal with second sound wave information transmitted from the business operator terminal, and may pay points to the account of the user terminal when the first sound wave information matches the second sound wave information. In this case, the first sound wave information and the second sound wave information may include noise at a shop, jingle of a shop, ultrasound information, and the like at the business site. In other words, the user who visits the business site transmits noise at the business site as the first sound wave information through the user terminal and the reward means managing unit 130 compares the nose at the business site at a time acquired by the first sound wave information with the second sound wave information to determine whether the user visits the shop and then pay points. In this case, the reward means managing unit 130 may doubly process authentication by causing the user terminal to acquire primarily an NFC tag and thereafter acquire secondarily sound wave information.

In addition, the reward means managing unit 130 may recognize the NFC tag to provide a coupon available at the business site among coupons stored on the account of the user terminal. The reward means managing unit 130 provides a coupon available at the business site using the location information of the user terminal and the NFC tag acquired from the user terminal. In this case, link information in the form of a uniform resource locator (URL) at which a coupon that can be used by the user although not stored on the user account can be issued. The reward means managing unit 130 may selectively provide a coupon according to the expiration date. For example, when there are several types of coupons usable at the same business site, the coupons may be given priority according to the expiration date and then provided.

In addition, the reward means managing unit 130 may accumulate an additional reward means when a coupon is used at the business site, and may manage an unused reward means to be sold to a third party. For example, when the user uses a coupon, an additional point may be primarily accumulated according to the use of the corresponding coupon and an additional point may be secondarily accumulated by selling an unused coupon to a third party. In this case, the user may convert a coupon which can be used at a specific business site into points that can be used at another business site by selling the coupon to a third party. In this case, it is possible to deduct points of the third party who has purchased the coupon. The reward means managing unit 130 may allow for purchasing a coupon held by a third party with points.

The route guiding unit 140 acquires a consumption pattern of the user in accordance with the time and region from the user terminal and displays at least one activity route on an electronic map to provide a schedule by which reward means of a plurality of business sites can be accumulated or used. The route guiding unit 140 acquires the consumption pattern of the user by data mining of card payment history, website visit history, and Internet search history through a social networking service (SNS) account or short message service (SMS) of the user terminal. The route guiding unit 140 may create an electronic map and set a travel route by mapping business sites on the map. For example, it is possible to collect reward means related to stores and restaurants that are frequently visited by a user having a consumption pattern of shopping and eating together. Also, it is possible to set a travel route in which the reward means is most provided.

The online/offline marketing management server 100 using an NFC tag according to one embodiment of the present invention may further include a payment processing unit. The payment processing unit processes an advanced reservation at the business site on the activity route and allows payment to be made by reflecting the reward means from a predetermined payment means when the NFC tag is recognized from the user terminal. This is to enable the pre-order or advance payment to be made before the user visits the business site. In other words, the user may make an advance payment for a product or service of the business site on the activity route where the user will visit, wherein the payment may be made at a discounted price to which the reward means is applied. In this case, convenience may be improved in that there is no need to undergo authentication at the time of direct payment at each business site. In this case, when an NFC tag at the business site is tagged with the user terminal, the amount paid in advance is deposited into an account of the business site. Therefore, it is possible to omit or simplify a cost settlement process at the business site.

In addition, the online/offline marketing management server 100 using an NFC tag according to one embodiment of the present invention may further include an advertisement content managing unit 160.

The advertisement content managing unit 160 provides advertisement content of a business operator placed within a predetermined range according to a connection position of the user terminal of the user visiting the business site. The advertisement content managing unit 160 provides advertisement content of the business operator located with the predetermined range according to the location of the user terminal. In this case, the advertisement content managing unit 160 creates advertisement content using information preset by the business operator willing to provide an advertisement and stores the advertisement content in an advertisement database (DB) (not shown). For example, where the user is located at a specific region, the location information of the user terminal is acquired and advertisement content related to nearby business operators is provided.

In addition, the advertisement content managing unit 160 may create the advertisement content with a voice, images, a video, and the like, and a link access address may be provided to the user terminal, or the advertisement content may be provided in the streaming form. That is, the advertisement content may be set to be received by the user for a predetermined period of time.

Meanwhile, the online/offline marketing management server 100 using an NFC tag according to one embodiment of the present invention may further include a game content managing unit 170.

The game content managing unit 170 provides game content to the user terminal when a reserved buyer executes advertisement content for a predetermined period of time or selects a predetermined number of identification regions displayed on the advertisement content. Also, the game content managing unit 170 may provide game content differently according to a type of an NFC tag when the reserved buyer acquires and transmits the NFC tag located at a shop of an advertisement operator. This is to provide an additional reward to the corresponding reserved buyer when the reserved buyer visits an advertised business displayed on an idea page and acquires the NFC tag. Here, an identification code may include identification number, a barcode, a QR code, an AR code, and the like, but is not necessarily limited thereto.

Figure 3:
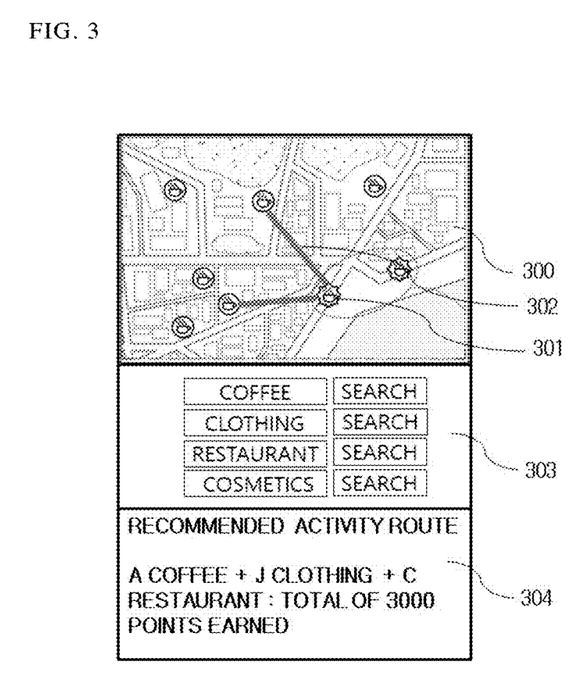
FIG. 3 is an example diagram for describing a case where the online/offline marketing management server using an NFC tag in accordance with FIG. 2 provides an activity route for a reward means on an electronic map.

FIG. 3 is an example diagram for describing a case where the online/offline marketing management server using an NFC tag in accordance with FIG. 2 provides an activity route for a reward means on an electronic map.

Referring to FIG. 3, a plurality of business sites 301 are mapped on an electronic map 300. In this case, an optimal activity route 302 may be displayed by analyzing a user's consumption pattern. The activity route 302 is a route passing through the plurality of business sites 301 and includes all routes that the user travels on foot or by transportation means. At least one activity route 302 may be set. Also, the user may search for nearby shops on the basis of his/her location information to check point information. In this case, search may be performed by inputting a user's preferred shop or category into a search window 303. The maximum reward means in accordance with the activity route 302 may be displayed on a reward means window 304. For example, in a case where "A coffee+J clothing+C restaurant" is set as an optimal activity route 302, information indicating that up to 3000 points can be acquired at corresponding business sites is provided to guide the user in setting a travel route.

In addition, in a case where there is an accumulation of or expiration date of the reward means, the activity route may be guided using the accumulation or the expiration data as a schedule. For example, it may be possible to differently guide the reward means that can be accumulated or used according to the date, such as accumulation of a total of 3000 points at "A coffee+J clothing+C restaurant" on Apr. 6, 2018 or accumulation of a total of 1500 points at "A coffee+C restaurant" on Apr. 7, 2018. Accordingly, the user may select a schedule at which the most reward means can be acquired or used according to his/her consumption pattern, and may move.

Figure 4:
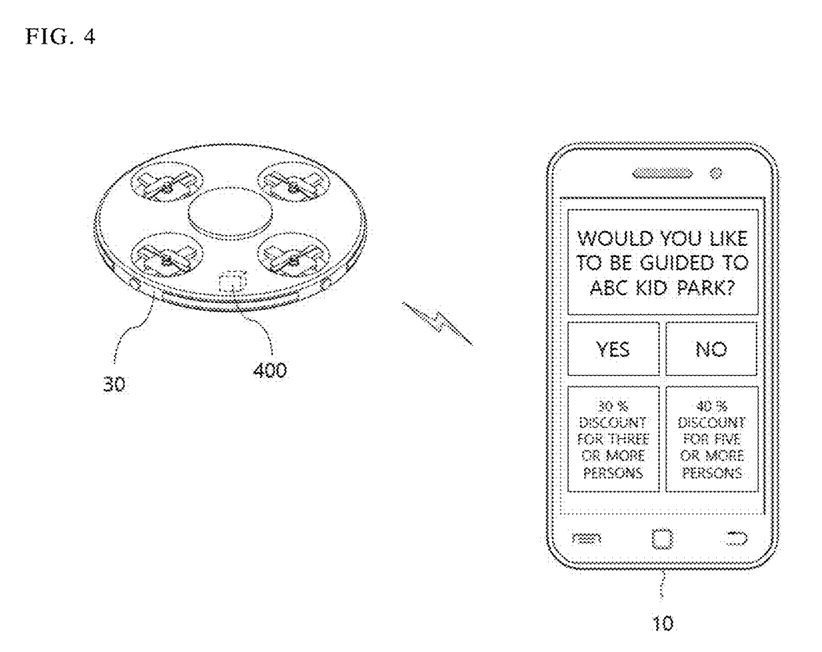
FIG. 4 is an example diagram for describing a case in which an online/offline marketing management server using an NFC tag in accordance with FIG. 2 forms an NFC tag in a drone.

FIG. 4 is an example diagram for describing a case in which an online/offline marketing management server using an NFC tag in accordance with FIG. 2 forms an NFC tag in a drone.

Referring to FIG. 4, where an NFC tag is formed in a drone 30 flying in a business site, a flight path of the drone 30 is managed with a preset schedule. For example, in the case of a kid park or an amusement park, a plurality of drones 30 may be set to fly over a set flight zone. In this case, the user may tag an NFC tag of the drone 30 flying nearby to accumulate or use a reward means. Also, the accumulation of the reward means may be varied according to a location of the drone 30.

In addition, the drone 30 may guide a travel route from a location of the user terminal 10 to a business site that provides a reward means. This is to induce visits by guiding the way to a business site when the business site is located in a place difficult to find. In this case, when the NFC tag of the drone 30 is tagged, a guide map or a type of reward means of the corresponding business site is informed, and upon the user's approval, the corresponding drone 30 flies a route along which the user moves to the business site. Accordingly, the user may be easily guided to the business site and the business operator may attract the customer to the business site without a human intervention.

Figure 5:
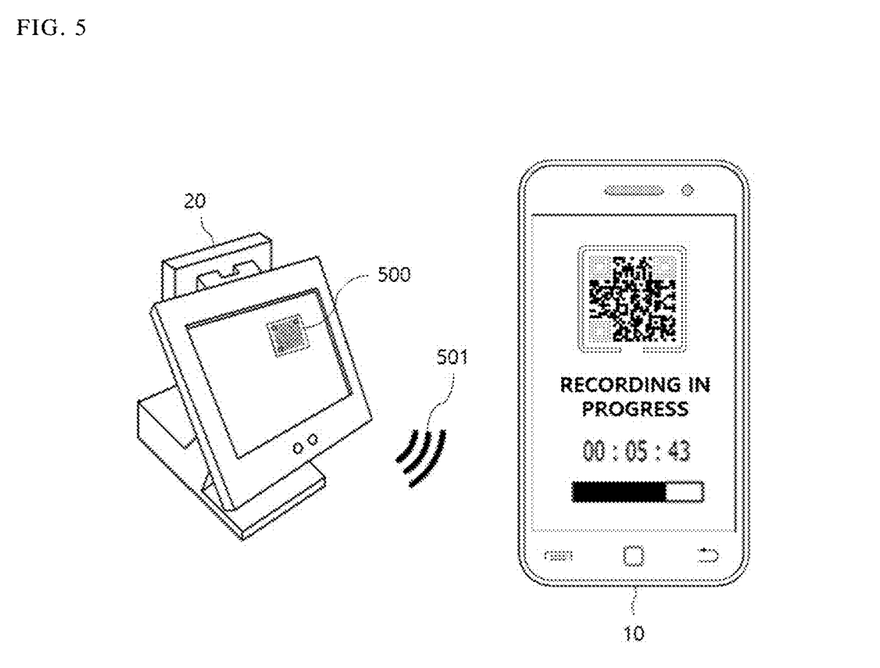
FIG. 5 is an example diagram for describing a case where the online/offline marketing management server using an NFC tag in accordance with FIG. 2 uses sound wave information acquired from a user terminal.

FIG. 5 is an example diagram for describing a case where the online/offline marketing management server using an NFC tag in accordance with FIG. 2 uses sound wave information acquired from a user terminal.

Referring to FIG. 5, the user terminal 10 may acquire an NFC tag 500 and sound wave information 501 through a business operator terminal 20 at a business site. For example, where the business operator terminal 20 is a POS terminal, the NFC tag 500 may be presented through a display or a receipt. In addition, unique sound wave information 510 may be output through a speaker. In this case, the sound wave information 501 is not limited to the user's audible frequency range including ultrasound waves. The sound wave information 501 is obtained by encrypting unique information of the business site into a sound wave signal, and the online/offline marketing management server may analyze the unique information of the business site by sampling the sound wave information 501. The user terminal 10 may primarily acquires the NFC tag 500, secondarily records the sound wave information 501, and transmits the sound wave information 501 to the online/offline marketing management server. In this case, the NFC tag 500 and the sound wave information 501 may be preferably changed at a predetermined time interval.

Figure 6:
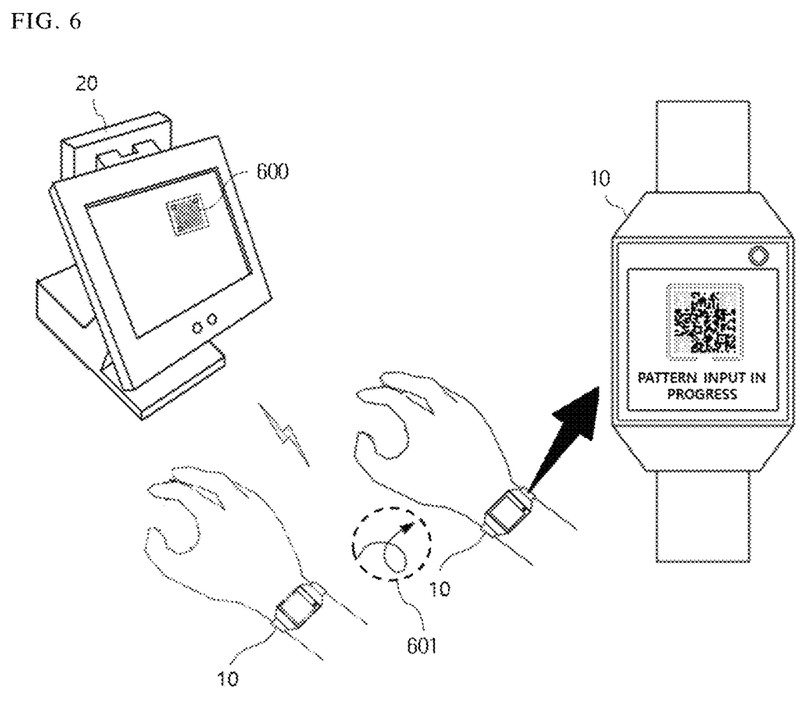
FIG. 6 is an example diagram for describing a case where the online/offline marketing management server using an NFC tag in accordance with FIG. 2 uses pattern information acquired from a user terminal.

FIG. 6 is an example diagram for describing a case where the online/offline marketing management server using an NFC tag in accordance with FIG. 2 uses pattern information acquired from a user terminal.

Referring to FIG. 6, in a case where the user terminal 10 is in a wearable form, when an NFC tag 600 formed in the business operator terminal 20 is acquired and afterwards preset pattern information 601 is acquired through the user terminal 10, points may be paid to the account of the user terminal 10. In this case, the user terminal 10 may preferably have an acceleration sensor and a tilt sensor mounted therein. When the user terminal 10 primarily acquires the NFC tag 600 formed in the business operator terminal 20, the user terminal 10 secondarily input the pattern information 601. In this case, the pattern information 601 of the user terminal 10 may be set to a pattern preset in the business site. Accordingly, the user does not simply acquire the NFC tag 600, but generates pattern information 601 by following a specific movement, thereby minimizing fraudulent use.

Figure 7:
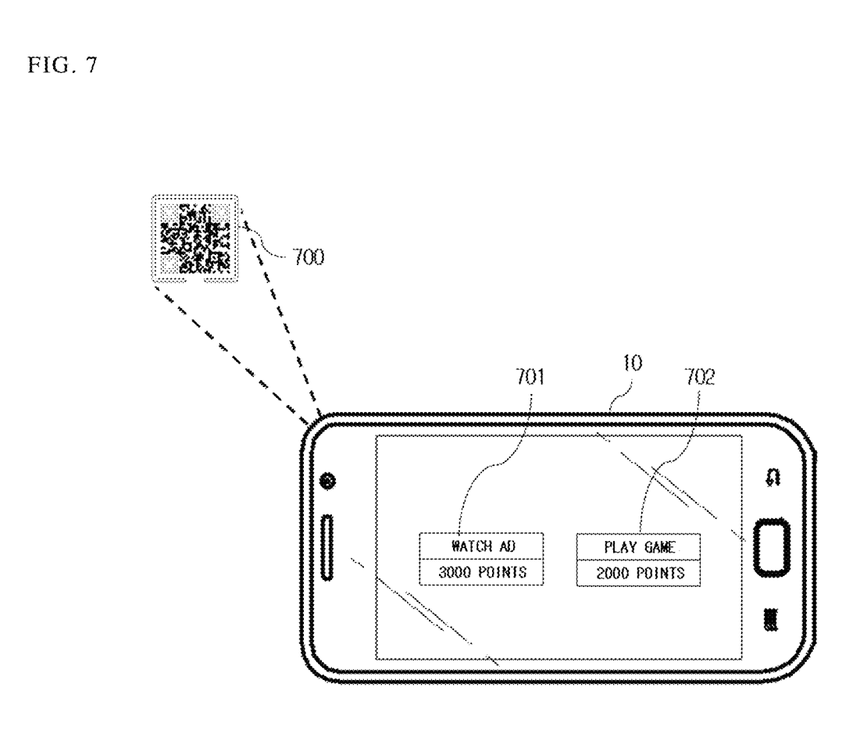
FIG. 7 is an example diagram for describing a case where the online/offline marketing management server using an NFC tag in accordance with FIG. 2 provides points according to advertisement content and game content.

FIG. 7 is an example diagram for describing a case where the online/offline marketing management server using an NFC tag in accordance with FIG. 2 provides points according to advertisement content and game content.

Referring to FIG. 7, an NFC tag 700 may be attached to the business operator terminal or a wall at the business site. Also, in addition to the NFC tag 700, a barcode, a QR code, and an AR code may be formed as identification codes.

When the NFC tag 700 is recognized using the user terminal 10 or information acquired using near-field communication, such as infrared data association (IrDA) communication, Bluetooth communication, or the like, or a wireless data communication is transmitted to the online/offline marketing management server, corresponding game content 702 may be provided. Accordingly, advertisement content 701 may be primarily provided through the user terminal 10 at the business site and points may be provided by executing the advertisement content 701. Then, the game content 702 may be secondarily provided by acquiring the NFC tag 700 installed at a shop of an advertisement operator, and additional points may be provided by executing the game content 702.

Also, where the user purchases a product at the shop of the business operator, the NFC tag 700 may be provided through a purchase receipt of the corresponding product or at a counter. The NFC tag 700 is provided to the user who has purchased an actual product by visiting the shop of the business operator, and the additional points are provided when the game content 702 corresponding to the NFC tag 700 is executed. In this case, the additional points may be provided differently depending on the type of game content 702.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An online/offline marketing management server using a near-field communication (NFC) tag, the online/offline marketing management server comprising:
   a communication unit configured to communicate with a user terminal;
   an NFC tag managing unit configured to manage NFC tag information formed at a business site;
   a reward means managing unit configured to accumulate a reward means, such as points or a coupon, on an account of the user terminal or manage the reward means to be used when the NFC tag is recognized from the user terminal; and
   a route guiding unit configured to acquire a user's consumption pattern according to time and region from the user terminal and display at least one activity route on an electronic map to provide a schedule by which reward means of a plurality of business sites can be accumulated or used
   wherein, when the NFC tag is formed in a drone flying in the business site, the NFC tag managing unit is configured to manage a flight path of the drone with a preset schedule and vary an accumulation of the reward means according to a location of the drone.

2. The online/offline marketing management server of claim 1, further comprising a payment processing unit configured to process an advanced reservation at the business site on the activity route and allow payment to be made by reflecting the reward means from a predetermined payment means when the NFC tag is recognized from the user terminal.

3. The online/offline marketing management server of claim 2, wherein the reward means managing unit is configured to compare first sound wave information transmitted from the user terminal and second sound wave information transmitted from the business site and pay an additional reward means to the account of the user terminal when the first sound wave information matches the second sound wave information.

4. The online/offline marketing management server of claim 1, wherein the NFC tag managing unit is configured to use the drone to guide a travel route from a location of the user terminal to the business site where the reward means is provided.

* * * * *